United States Patent [19]
Trankner

[11] 3,779,146
[45] Dec. 18, 1973

[54] REFLEX PHOTOGRAPHIC CAMERAS
[75] Inventor: Werner Trankner, Dresden, Germany
[73] Assignee: VEB Pentacon Dresden Kamera- und Kinowerke, Dresden, Germany
[22] Filed: Apr. 4, 1972
[21] Appl. No.: 240,553

Related U.S. Application Data
[63] Continuation-in-part of Ser. No. 100,274, Dec. 21, 1970, abandoned.

[30] Foreign Application Priority Data
May 27, 1970 Germany............WP 57 a/147 755
Aug. 16, 1971 Germany.........WP G 03b/157 133
[52] U.S. Cl. .................................... 95/42, 355/68
[51] Int. Cl. .......................................... G03b 19/12
[58] Field of Search............................ 95/42; 355/68

[56] References Cited
UNITED STATES PATENTS
3,280,714  10/1966  Günther et al.................... 95/42
3,464,339  9/1969  Trankner.............................. 95/42
3,464,337  9/1969  Trankner.............................. 95/42

Primary Examiner—Samuel S. Matthews
Assistant Examiner—Richard A. Wintercorn
Attorney—Irvin S. Thompson et al.

[57] ABSTRACT

A reflex camera having a photoelectric exposure meter includes a light concentrator guide having reflective surfaces mounted on and arranged behind the reflex mirror which is partially transparent (half silvered). The light concentrator guide is provided with a first reflective surface lying transversely of the optical axis of the object lens of the camera and a second reflective surface lying transversely of the optical axis. The second reflective surface reflects light rays entering the light concentrator guide from the object lens of the camera towards a light emergent surface thereof. A photoelectric receiver is situated opposite the light emergent surface of the light concentrator guide to receive the light rays.

14 Claims, 6 Drawing Figures 3,779,146

REFLEX PHOTOGRAPHIC CAMERAS

This is a continuation-in-part application to United States application Ser. No. 100274, filed on 21st Dec. 1970, and now abandoned.

BACKGROUND TO THE INVENTION

This invention relates to a reflex photographic camera employing a photoelectric exposure meter having a light concentrator conductor or guide with totally reflecting and refracting surfaces and at least one photoelectric receiver, for example a photoconductive cell, arranged behind the light emergence surface of the light guide.

Internal exposure meters in mirror reflex cameras are known, using light guides which have the property of collecting the light coming from the subject and partially reflected in, as a result of multiple reflection, within the light guide and feeding it to a photoelectric receiver arranged behind the light emergence surface of the light guide. The known arrangements show that the light guide is accommodated either in the picture-taking space or at another point situated outside the picture-taking space of the camera. The known forms of embodiment have the serious disadvantage that the photoelectric receiver, which is situated for example in the picture-taking space of the camera, and receives the light supplied by a light guide is directly exposed to the false light coming from the view-finder eyepiece. Avoiding this disadvantage, the photoelectric-receiver was pivotally arranged in the hinged mirror space. This has the result that before the taking of a picture the photoelectric-receiver must be pivoted out of the object ray path by special mechanical means. Finally it should also be mentioned that with known arrangements of pivotable small-area photoelectric-receivers it is possible to make a partial measurement only. Furthermore, a disadvantage is seen is the fact that both in the case of integral and in the case of partial measurements, no optimum exposure of a picture is achieved.

SUMMARY OF INVENTION

According to the present invention there is provided in a photographic mirror reflex camera having a reflex mirror pivotable between a first position in which light rays from the object lens of the camera are deflected towards the viewfinder eyepiece and a second position out of the light rays path to expose film to the light rays from the object lens, and a photo-electric receiver located within the camera to receive a portion of the object light rays incident upon the reflex mirror in its first position, the provision of a photoelectric exposure meter comprising light concentrator guide means mounted in a plane-parallel manner on and arranged behind the reflex mirror, relative to the direction of the object light rays, which reflex mirror is partially transparently mirror coated, the photoelectric receiver positioned within the camera being located so as to receive light from a light emergent surface of the light concentrator guide means, said light concentrator guide means being provided with a first reflective surface lying transversely of the optical axis of the camera object lens and obliquely to the near wall of the reflex mirror, and a second reflective surface lying transversely of said optical axis, wherein the second surface deflects light rays from the first surface to concentrate light rays in the direction of the face of the light emergent surface of the light guide to illuminate the photoelectric receiver, and wherein light from the viewfinder eyepiece being incident upon the first reflective surface is reflected away from the light concentrator guide means.

In one form of the invention the photoelectric exposure meter comprising light concentrator guide means in the form of a flat transparent plate mounted in a plane parallel manner on and arranged behind the reflex mirror which is partially transparently mirror-coated said light concentrator guide means being provided with a first group of several reflective surfaces lying transversely of the optical axis of the camera object lens and a second group opposite to this first group of reflective surfaces having several reflective and refractive surfaces lying transversely of and inclined at substantially 45° to the said optical axis wherein the latter surfaces deflect light rays from the first group of reflective surfaces to concentrate the light rays in the direction of the face of the light emergent surface of the light concentrator guide to illuminate a photoelectric receiver situated opposite the light emergent surface of the light guide and wherein light from the viewfinder eyepiece being incident upon the first group of reflective surfaces is reflected away from the light concentrator guide.

In a preferred form the light concentrator guide means comprises a first elongate plate having the reflection surfaces of the first group, provided on one longitudinal edge of the light guide, these surfaces in vertical section being so inclined in use in relation to the optical axis of the object lens of the camera that both axial and oblique extra-axial rays, extending nearly parallel with the plane surface in the light guide, arrive upon the second group of reflection and refraction surfaces deflecting the light rays and conducting them towards the light emergence face of the light guide, the second group of surfaces, being arranged along the other longitudinal edge of the light guide as wedge-shaped incisions forming air wedges lying side by side, in such a way that the first reflection and at the same time refraction surface of the second group is inclined at substantially 45° to the said optical axis, and the second refraction surface from the wedge angle for the air wedge.

In order to ensure optimum formation of part-integral surface sensitivity, the invention provides for the simplification of the light concentrator guide construction as regards the arrangement of reflection surfaces.

Further according to the present invention there is provided a camera, wherein the light concentrator guide means has two longitudinal edges and two shorter edges interconnecting the longer edges and wherein the first reflection surface is formed by at least a part of the one of said longitudinal edges innermost of the reflex mirror, which part is at an oblique angle with the optical axis of the object lens, and the second reflection surface is formed by the one of the said shorter edges which is furthermost from the photoelectric receiver, said second reflection surface subtending an angle of substantially 45° with the first reflection surface, so that light rays entering the light guide means are reflected through substantially 90° towards the light emergent surface thereof and the photoelectric receiver.

By the provision of this additional feature the construction of the light guide means is further simplified. Such simplification enables the losses occurring as a result of a multiplicity of reflecting and refractive surfaces provided on the light guide to be considerably reduced, thus improving the light yield within the light guide and rendering the exposure measuring operation more accurate.

In a further embodiment constructed in accordance with the invention, two longitudinal sides converge towards the light emergent surface of the light guide. The first and the second reflecting surfaces of the said light guide, which are situated at an angle to each other, are mainly situated in the central part of the reflex mirror.

The advantages offered by this improved construction are due to low light losses. For example, the light yield obtained with the light guide constructed and arranged in accordance with latter construction is about 70 percent greater than that obtained with the light guide of the earlier mentioned construction. Furthermore, the advantageous arrangement of the light guide on the compartment for the reflex mirror is characterized by an optimum partly integral surface sensitivity. This partly integral surface sensitivity is geometrically about the same size as the measuring indicators of the image field lens or of the image setting disc for focussing the lens. Finally, owing to the simple construction of the light guide, with far fewer reflecting surfaces, the apparatus according to the invention can be constructed more simply and thus more economically.

BRIEF DESCRIPTION OF DRAWINGS

Constructional embodiments of the invention will now be described by way of example with reference to the accompanying drawings, in which.

DESCRIPTION OF PREFERRED EMBODIMENTS

Figure 1:
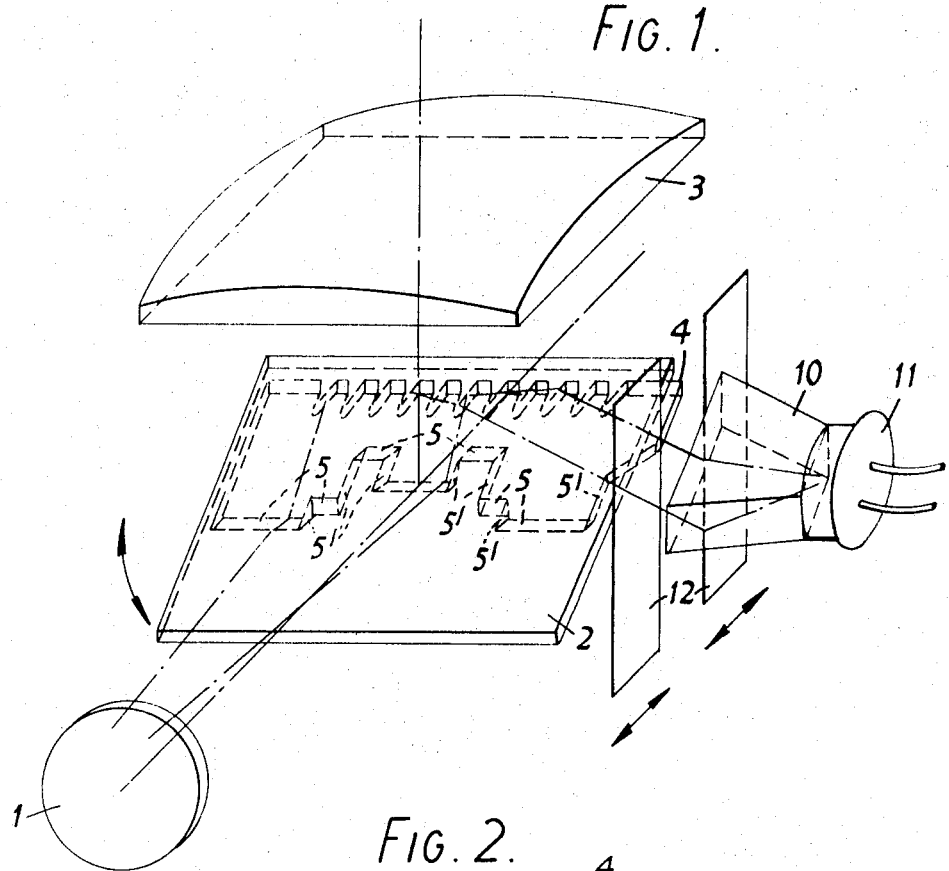
FIG. 1 shows a mirror-reflex viewfinder device with photoelectric receiver.

Referring now to the drawings and in particular to FIG. 1, the light coming from the subject (not shown) passes through an object lens 1 and is guided by way of a reflex mirror 2 to an image field lens 3 in a viewfinder system not illustrated further. The reflex mirror 2 which can be pivoted in known manner into or out of the object ray path, is partially transparently mirror-coated. Behind the partially mirror-coated reflex mirror 2 a light concentrator guide 4 is arranged in the form of a flat transparent plate. According to FIGS. 2 and 3 the light guide 4 has on the lower edge of its longitudinal side a first group of reflecting surfaces 5 and on the upper edge of the longitudinal side a second group of both reflecting and refracting surfaces 6, 7. The lower edge with the reflecting surfaces 5 is situated predominantly in the middle part of the reflex mirror 2. Air wedges 8 formed by the reflecting and refracting surfaces possess different incision depths, the significance of which will be discussed later.

Laterally of the reflex mirror 2 a further light concentrator guide 10 provided with light-gathering properties is arranged, on the light emergence surface of which a photoelectric receiver, for example photoconductive cell 11, with or without air gap is situated. Between reflex mirror 2 and photoelectric receiver 11 a movable diaphragm 12 is arranged whereby it is possible to be able to carry out even partial exposure measurements.

The light guidance of the light rays coming from the lens 1 to the photoelectric-receiver 11 is as follows:

If the reflex mirror 2 is situated in the viewfinder image viewing position according to FIG. 1, a part of the light rays coming from the lens 1 is directed by the mirror 2 to the image field lens 3, the other part of the light rays pass through the partially transparently mirror-coated reflex mirror 2. All the light rays falling upon the obliquely lying surfaces 5 of the light guide 4 are reflected and pass, without emerging from the light guide 4, to the opposite surfaces 6 of the wedge-shaped incisions and the air wedges 8 formed thereby. The reflecting surfaces 6, inclined at about 45° to the centre beam of the optical system, are refracting surfaces at the same time also as a result of the air wedge 8. As may be seen from the ray path according to FIGS. 1 to 3, the light rays impinging upon the surfaces 6 are reflected by nearly 90°, pass on to the surfaces 7, are refracted by these, enter the air wedge 8 in order and are there reflected by the surfaces 6, to re-enter the light guide 4. According to the number of wedge-shaped incisions lying side by side and according to the position of the light rays impinging upon the surfaces 6, these rays pass several times through the wedge-shaped incisions on the light guide 4.

In order not to reduce the intensity of the measurement light path within the light guide by reflection losses on the glass-air surfaces 6 and 7, these are de-reflected. In this connection the incision depth of the air wedges 8 also diminishes towards the lateral light emergence surface of the light guide 4, so that a part of the rays reflected by the surfaces 6 does not pass through the air wedges 8 at all or passes through only a few times.

Figure 2:
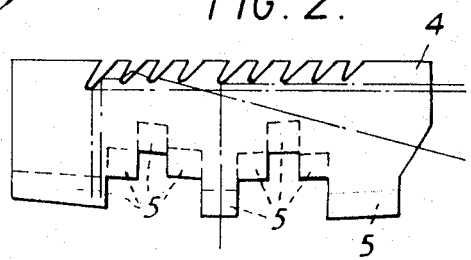
FIG. 2 shows a light guide in front view.

As may be seen from FIG. 2 the position of the reflection surfaces 5 in relation to the centre beam or main beam is very different. For the purpose of an optimum light concentration in the light guide 4, for the correct position of the reflection surfaces 5 an intersection range is adopted, the magnitude of which is determined by the average position of an assortment of lenses of different focal lengths. These reflection surfaces 5 are therefore so inclined in relation to the vertical centre section that the reflected rays extend nearly parallel in the light guide 4, while total reflection prevails on the reflection surfaces 5. The same also applies to extra-axial rays which fall obliquely upon the reflection surfaces 5.

In relation to the part-integral measurement method the position of the reflection surfaces 5 is so arranged that it permits measurement of the image area a little below the centre. To avoid scattering reflection, which derives from the eyepiece false light, the side surfaces 5' adjoining the reflecting surfaces 5 are darkened. Furthermore to reduce the influence of false light due to scattering reflection, a thin mask (not shown in the drawing) consisting of non-transparent material can be arranged between reflex mirror 2 and light guide 4. This mask possesses apertures for the passage of the light rays impinging upon the reflection surfaces 5. In place of the mask the mirror 2 can be equally fully mirror-coated to such extent that only parts of this mirror, which lie above the first group of reflecting surfaces 5 of the light guide 4, are partially mirror-coated, in order thus to permit the passage of light rays coming from the object lens to the first group of reflection surfaces 5. It is within the scope of the invention that the mirror 2 and light guide 4 consist of a one piece structure.

Figure 3:
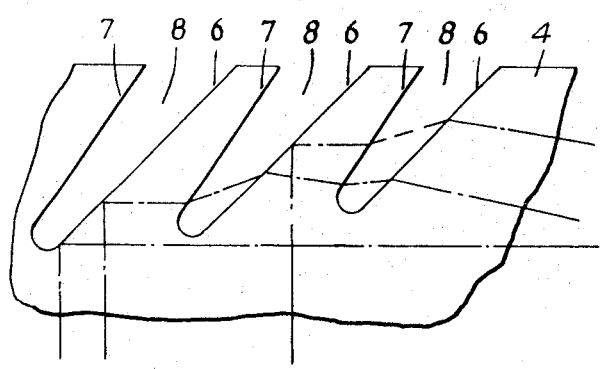
FIG. 3 shows a greatly enlarged part of the light guide.
Figure 4:
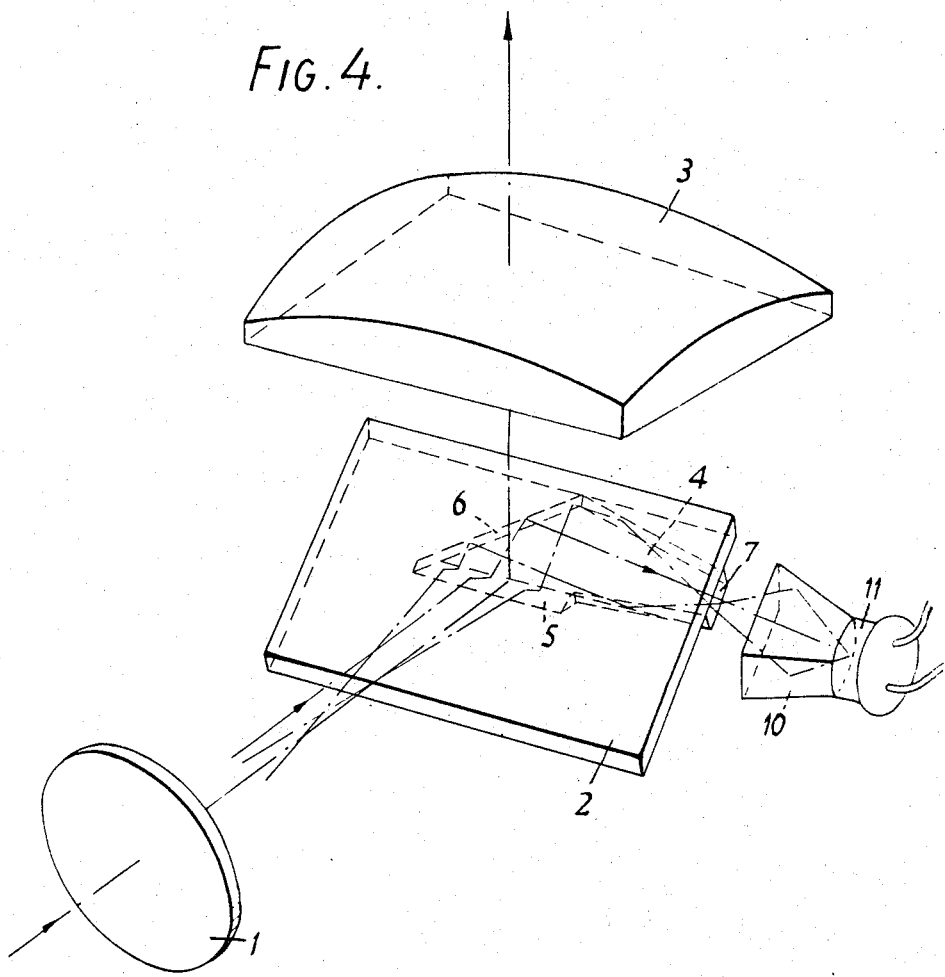
FIG. 4 shows an improved form of mirror reflex viewfinder device with photoelectric receiver.

Referring now to FIG. 4 in which parts similar to like parts in FIGS. 1 to 3 have the same reference numerals, light emanating from the subject (not shown) passes through the object lens 1 and is guided via the reflex mirror 2 to the image field lens 3, into a viewfinder system not shown in detail. Behind the reflex mirror 2, which is partly provided with a transparent mirror coating, is the light guide 4 which takes the form of a flat transparent plate and forms one component in conjunction with the reflex mirror 2, a first reflective surface 5, oblique in respect of the object direction, extends partly along the lower edge of the longitudinal sides of the light guide 4. A further reflective surface 6, which interconnects the upper and the lower longitudinal sides of the light guide 4, and which, starting from the lower edge of the guide 4 relative to FIG. 4, encloses an angle of approximately 45° and deflects the light fluxes emanating from the first reflective surface 5 by an angle of about 90° in respect of the object direction, in order to illuminate a photo-electric receiver 11, such as a photo-cell, situated behind the light emergent surface 9 of the light guide 4. Owing to the conical course taken by the longitudinal edges of the light guide 4 the latter tapers in the direction of the light exit surface 9, as a result of which the light flux is collected or concentrated inside the light guide. The guiding of the light inside the light guide 4 without loss ensures an optical light yield. The first reflective surface 5, serving as the light entry surface, is advantageously situated, together with the second reflective surface 6, in the central flat portion, behind the partly transparent reflex mirror 2, thus ensuring a high partly integral surface sensitivity for the exposure measuring apparatus. In order to enable the light to be guided to the photoelectric receiver 11 still more satisfactorily, a further conical light guide 10, with light concentrating properties, is provided between the receiver 11 and the light emergent surface 9 of the light guide 4.

As may be seen from FIG. 4, the light rays admitted through the reflex mirror 2, with its partly transparent mirror coated surface, are concentrated, after entering the light guide 4, by multiple reflections, on the surfaces 5 and 6, and by partly total reflections, on the tapering upper and lower longitudinal sides of the light guide 4, in order to emerge, in a concentrated form, from the surface 9, which is many times smaller than the entry surface 5.

Figure 5:
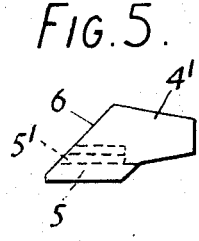
FIG. 5 is a front view of a further light guide.
Figure 6:
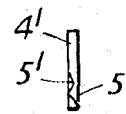
FIG. 6 is a side view of the light guide of FIG. 5.

FIGS. 5 and 6 show an alternative version of the light guide 4, that is light guide 4'. Between the first reflective surface 5 and the second reflective surface 6 forming an angle thereto are provided further reflective surfaces 5', there being at least two in number situated in succession to one another. This measure ensures optimum formation of part integral surface sensitivity.

What is claimed is:

1. In a photographic mirror reflex camera having a reflex mirror pivotable between a first position in which light rays from the object lens of the camera are deflected towards the viewfinder eyepiece and a second position out of the light ray path to expose film to the light rays from the object lens and a photoelectric receiver located within the camera to receive a portion of the object light rays incident upon the reflex mirror in its first position the provision of a photoelectric exposure meter comprising light concentrator guide means mounted in a plane parallel manner on and arranged behind the reflex mirror, relative to the direction of the object light rays, which reflex mirror is partially transparently mirror coated, the photoelectric receiver positioned within the camera being located so as to receive light from a light emergent surface of the light concentrator guide means, said light concentrator guide means being provided with a first reflective surface lying transversely of the optical axis of the camera object lens and obliquely to the near wall of the reflex mirror, and a second reflective surface lying transversely of said optical axis, wherein the second surface deflects light rays from the first surface to concentrate light rays in the direction of the face of the light emergent surface of the light guide to illuminate the photoelectric receiver, and wherein light from the viewfinder eyepiece being incident upon the first reflective surface is reflected away from the light concentrator guide means.

2. A camera as claimed in claim 1, including a photoelectric exposure meter comprising light concentrator guide means in the form of a flat transparent plate mounted in a plane parallel manner on and arranged behind the reflex mirror which is partially transparently mirror-coated, said light concentrator guide means being provided with a first group of several reflective surfaces lying transversely of the optical axis of the camera object lens and a second group opposite to this first group of reflective surfaces having several reflective and refractive surfaces lying transversely of and inclined at substantially 45° to the said optical axis, wherein the latter surfaces deflect light rays from the first group of reflective surfaces to concentrate the light rays in the direction of the face of the light emergent surface of the light concentrator guide to illuminate a photoelectric receiver situated opposite the light emergent surface of the light guide, and wherein light from the viewfinder eyepiece being incident upon the first group of reflective surfaces is reflected away from the light concentrator guide.

3. A camera as claimed in claim 2, wherein the light concentrator guide means comprises a flat elongate plate having the reflective surfaces of the first group provided on one longitudinal edge of the light guide, these surfaces in vertical section being so inclined in use in relation to the optical axis of the object lens of the camera that both axial and oblique extra-axial rays, extending nearly parallel with the plane surface in the light guide, arrive upon the second group of reflective and refractive surfaces deflecting the light rays and conducting them towards the light emergence face of the light guide, the second group of surfaces being arranged along the other longitudinal edge of the light guide as wedge-shaped incisions forming air wedges lying side by side, in such a way that the first reflective and at the same time refractive surface of the second group is inclined at substantially 45° to the said optical axis, and the second refractive surface forms the wedge angle for the air wedge.

4. A camera as claimed in claim 3, wherein the incision depth of the air wedges diminishes towards the lateral light emergence surface of the light concentrator guide.

5. A camera as claimed in claim 4 wherein the oblique reflective surface of the light concentrator guide is situated approximately in the middle region of the reflex mirror.

6. A camera as claimed in claim 5, wherein between the light emergence surface of the light concentrator guide and the photoelectric receiver a conical light ray concentrator guide is provided.

7. A camera as claimed in claim 6, including a movable diphragm arranged between the light concentrator guides.

8. A camera as claimed in claim 7, wherein the surfaces of the wedge-shaped incisions are de-reflected.

9. A camera as claimed in claim 8, wherein between the reflex mirror and the light concentrator guide there is situated a thin apertured mask consisting of non-transparent material, the apertures of which permit only the passage of light rays for the first group of reflective surfaces.

10. A camera as claimed in claim 9, wherein the reflex mirror and the light concentrator guide are formed integrally.

11. A camera as claimed in claim 1, wherein the first light concentrator guide means has two longitudinal edges and two shorter edges interconnecting the longer edges and wherein the first reflective surface is formed by at least a part of the one of said longitudinal edges innermost of the reflex mirror, which part is at an oblique angle with the optical axis of the object lens, and the second reflective surface is formed by the one of the said shorter edges which is furthermost from the photoelectric receiver, said second reflective surface subtending an angle of substantially 45° with the first reflective surface, so that light rays entering the first light concentrator guide means are reflected through substantially 90° towards the light emergent surface thereof and the photoelectric receiver.

12. A camera as claimed in claim 11, wherein between the first and second reflective surfaces at least two additional reflective surfaces are provided, the longitudinal axes of which are parallel to the longitudinal axis of the first reflective surface, to enable light to pass through the first and additional reflective surfaces in succession.

13. A camera as claimed in claim 12, wherein longitudinal edges of the first light concentrator guide means converge towards the light emergent surface of the said first light concentrator guide means.

14. A camera as claimed in claim 13, wherein the first second and additional reflective surfaces are in the main situated centrally of the reflex mirror.

* * * * *